Patented May 20, 1941

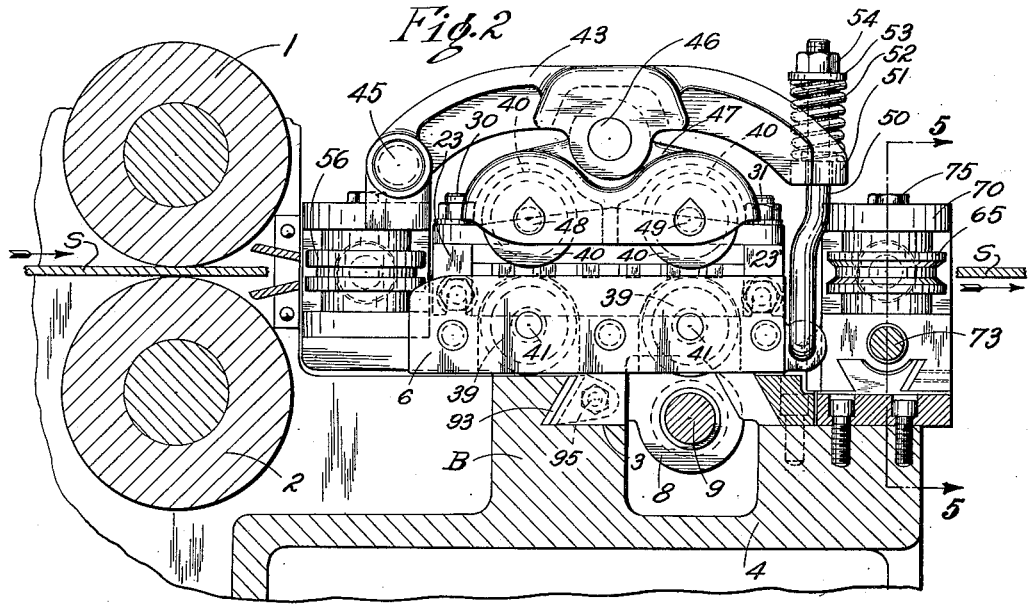
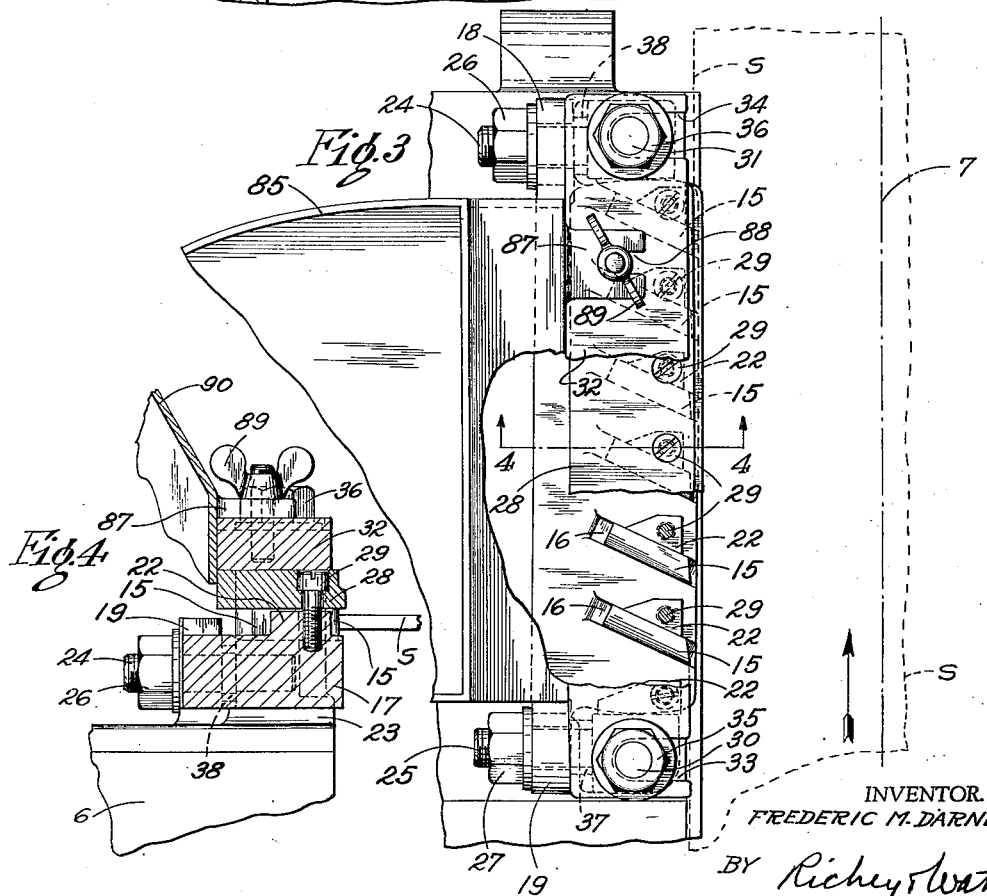

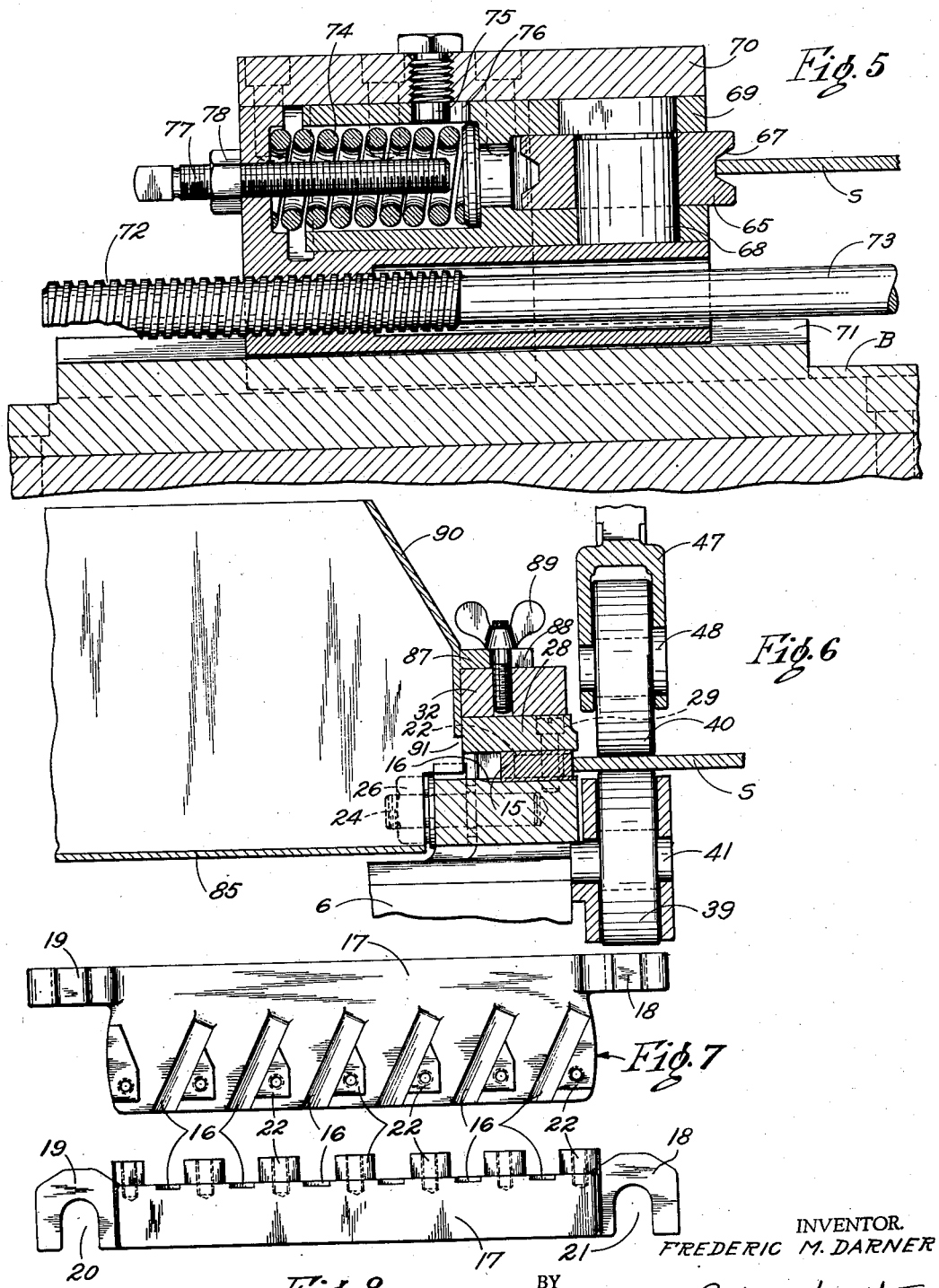

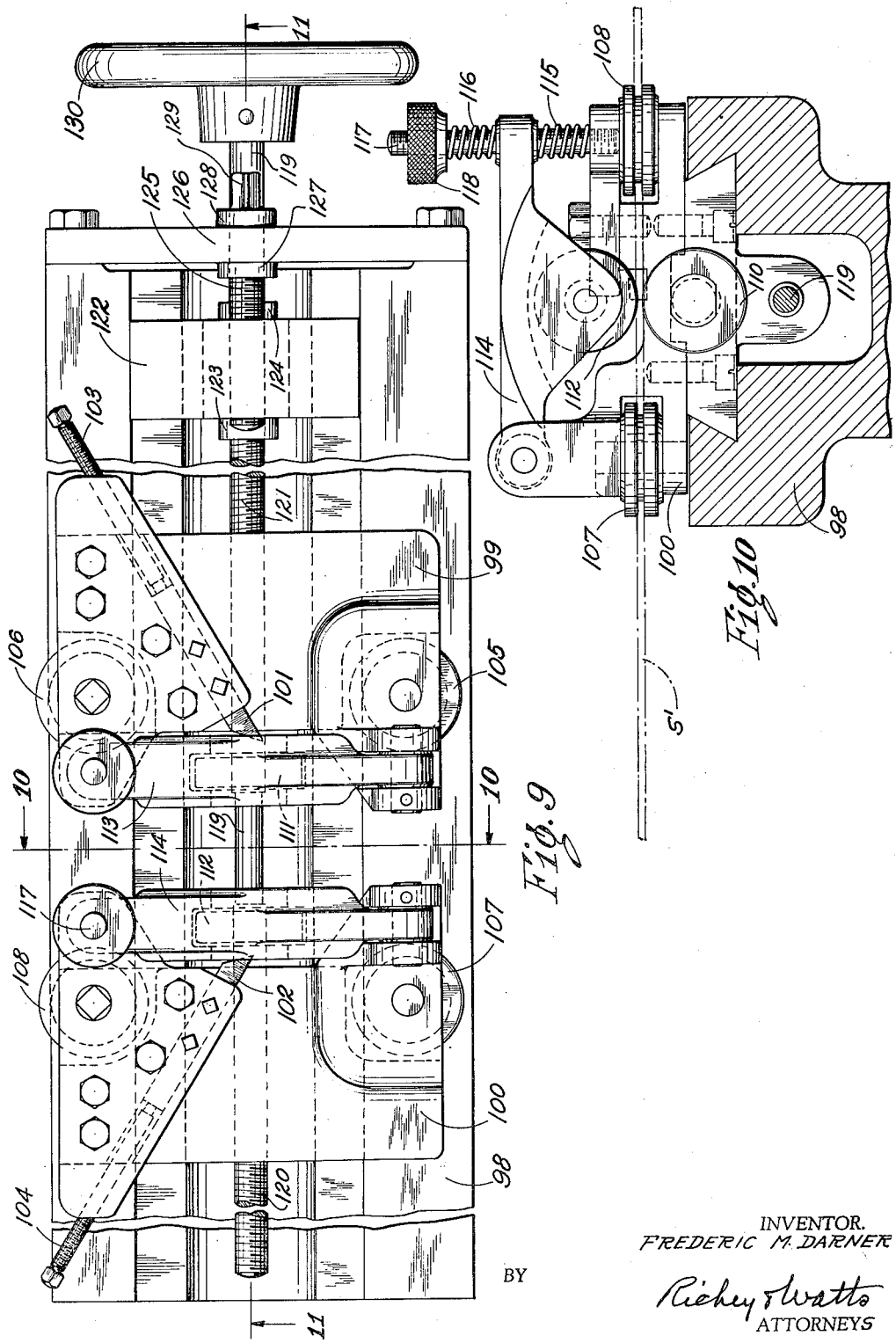

2,242,815

UNITED STATES PATENT OFFICE 2,242,815

STRIP TRIMMER

Frederic M. Darner, Shaker Heights, Ohio, assignor, by mesne assignments, to Republic Steel Corporation, Cleveland, Ohio, a corporation of New Jersey Application March 9, 1939, Serial No. 260,811

13 Claims. (Cl. 90—24)

This invention relates to the edge trimming of strip metal, and more particularly to an improved device for continuously trimming the edges of a strip of steel or the like prior to forming into pipe or tube and welding the trimmed edges together.

In the manufacture of welded tube and pipe, either by electrical resistance welding or other methods, it is extremely important that the strip from which the pipe is formed be maintained at exactly the proper width and that the edges be clean and smooth in order to facilitate proper welding contact. Prior to my invention a general practice, in electrical welding mills, has been to obtain strip from the steel mill which has been previously trimmed to accurate and proper edge surface width. This was necessary because of the absence of any practical and effective means for trimming the strip edges as they passed from the coil to the tube forming and welding machines. Mill edge stock (the term "mill edge" meaning that the edges of the strip are somewhat irregular and are exactly as they come from the rolling mill without trimming or finishing) is considerably cheaper than trimmed strip but cannot be used to make high quality tubing in the forming and welding operations because of its variations in width and uneven edge surfaces. My invention makes it possible for coils of mill edge strip to be fed directly and continuously to my strip trimmer and then to the forming and welding machines. No separate trimming operation with the accompanying recoiling and rehandling is necessary and substantial savings results. The relatively cheap mill edge strip, either hot or cold rolled, can be purchased and used with complete satisfaction. A fresh, clean, uniform welding surface is insured at all times and the width of the strip is accurately controlled at all times, thus greatly aiding in forming a perfect welded joint free from pin hole leaks and other defects and imperfections.

It is among the objects of my invention to provide a strip trimmer whereby strip having substantial variations in width and uneven and irregular edges, such as mill edge strip, may accurately and continuously be trimmed to the exact width required; the provision of a strip trimmer for use in connection with electric welding machines or the like whereby the width of the trimmed strip can be accurately adjusted and varied while material is passing through the trimming machine; the provision of a strip trimmer in which the set up and replacement of tools is simple and quickly effected; the provision of a strip trimmer in which the stock is supported during the trimming operation closely adjacent the point of cutting whereby buckling and chattering is prevented; the provision of a strip trimmer which will give the desired burrless edge obtained by a cutting tool, as distinguished from that obtained by a disc knife, and which will accommodate and handle substantial variations in the width of the strip entering the trimming machine without overloading the cutting tools and causing a rough cut or tear to occur; the provision of a strip trimmer which is adapted to handle a wide range of strip widths and in which the major adjustments of cutting knives and supporting devices may be effected by movement of a single adjusting means; the provision of a strip trimmer of the type described in which the trimmed off material is effectively prevented from becoming tangled with the mechanism or following along the strip into the forming or welding machine; and the provision of simple means for supporting and setting a plurality of cutting tools in a strip trimmer of the type described.

The above and other objects of my invention will appear from the following description of several embodiments thereof, reference being had to the accompanying drawings, in which—

Figure 2 is a vertical cross-sectional view taken on line 2—2 of Figure 1.

Figure 3 is an enlarged plan view, partly in section, showing the tool holder and its securing and adjusting mechanism together with the chip chute.

Figure 4 is a vertical cross-sectional view taken on line 4—4 of Figure 3.

Figure 5 is a fragmentary vertical cross-sectional view taken on line 5—5 of Figures 1 and 2.

Figure 6 is an enlarged fragmentary cross-sectional view taken on line 6—6 of Figure 1 and illustrating the cutting tool and chip chute.

Figure 7 is a detached plan view of the tool carrying member.

Figure 8 is a side elevation of Figure 7.

Figure 9 is a plan view of a modified form of strip trimmer in which a single pair of cutting tools is employed.

Figure 10 is a vertical cross-sectional view taken on line 10—10 of Figure 9.

It will be understood by those skilled in the art that my strip trimming machine, as applied to preparing the edges of a strip for welding into tube or pipe, is preferably located immediately ahead of the forming rolls which form the strip into tubular form and which are followed by the welding section of the machine. In operation the end of a coil of strip is inserted between the entering rolls 1 and 2 (Fig. 2) which are driven from any suitable source of power (not shown) and these rolls engage the strip and push it through the trimmer until it engages the tube forming rolls. These rolls, as is well understood, are driven and will continue to pull the strip through the trimming device. Except when the end of a new coil is being started into the machine, the strip will be pulled through the trimmer under tension.

Figure 1:
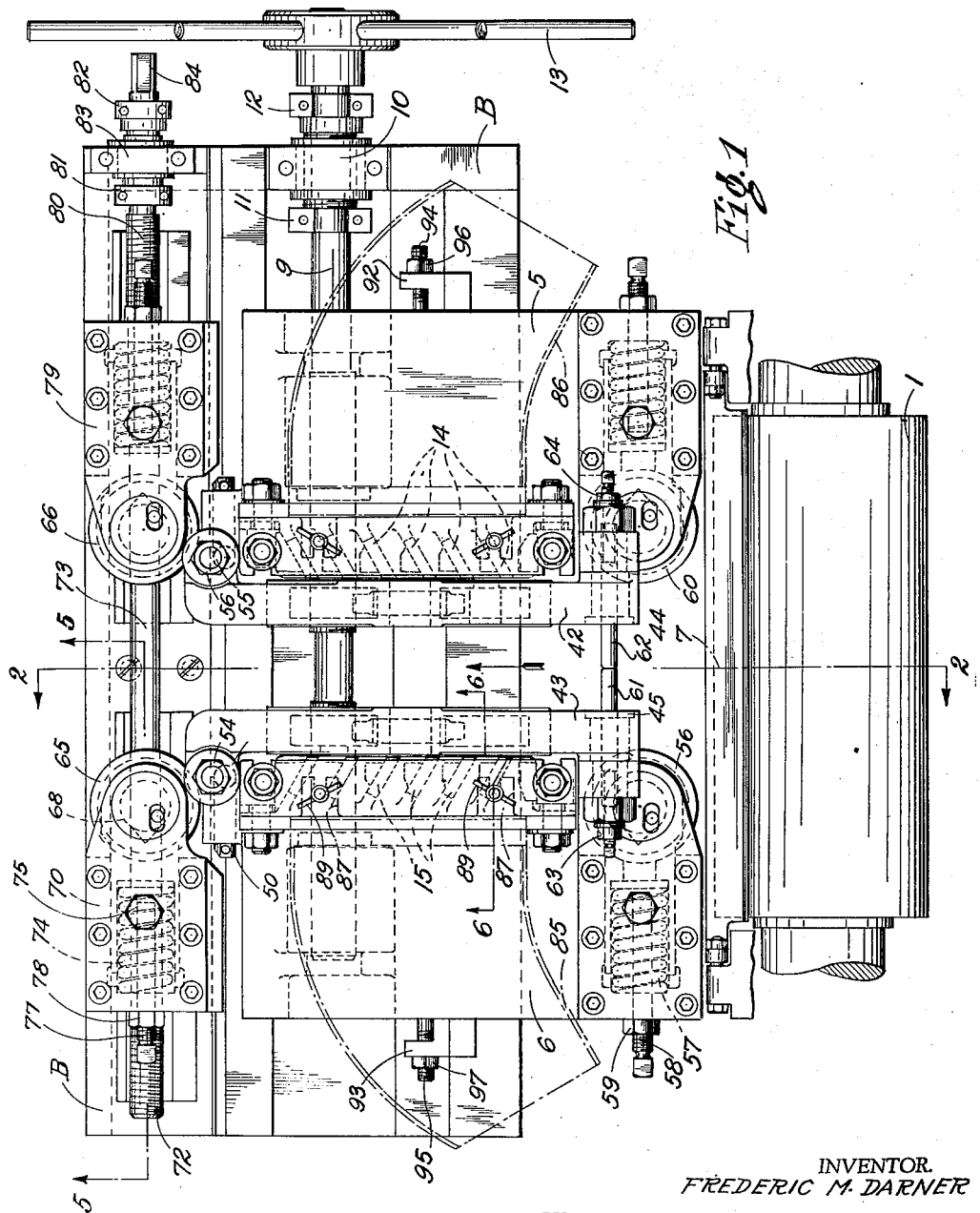
Figure 1 is a plan view of my strip trimming device.

Referring particularly to Figures 1 and 2, a stationary base B may be supported in any suitable manner. This base B carries a slideway 3 and has a transversely extending channel 4 below the slideway 3. Sliding supports 5 and 6 are mounted in the slideway 3 on opposite sides of the normal center line 7 of the strip which passes through the trimmer. Each of the brackets 5 and 6 has a downwardly extending portion 8 which is disposed within the channel 4 and which is threaded to accommodate the adjusting screw 9. The screw 9 is oppositely threaded at the portions which engage the brackets 5 and 6 and its outer end is supported in a bearing 10 on the base B. Suitable collars 11 and 12 restrain the screw shaft 9 from axial movement relative to the base B and it will be seen that rotation of the hand wheel 13, which is secured to the end of the screw shaft 9, will cause the supports 5 and 6 to be moved toward or away from each other on the base B, depending upon the direction of rotation of the screw 9.

In the embodiment of my invention shown in Figures 1 to 8 a series of cutting tools 14 are carried by the support 5 and a series of cutting tools 15 are carried by the support 6. As the parts which mount and secure these tools in position are similar on both the supports 5 and 6 only the mounting and adjusting means for the cutting tools 15 on the slide support 6 need be described.

Referring particularly to Figures 3, 4, 7 and 8 it will be seen that each of the tools 15 is disposed in a shallow groove 16 in the tool carrying member generally indicated at 17. This member 17, as is seen in Figures 7 and 8, has extensions 18 and 19 at its ends which extensions are vertically slotted at 20 and 21 (see Fig. 8). The top face of the member 17, in addition to having the shallow grooves 16, has a plurality of upwardly extending lugs 22, one adjacent each slot 16, which form abutments for the tools 15. The support 6 is provided with spaced upwardly extending lugs 23 and 23' (see Figs. 2, 3 and 4) which carry horizontally extending studs 24 and 25 and the slots 20 and 21 fit over the studs 24 and 25 and are secured against the lugs 23 and 23' by clamping nuts 26 and 27. The tools 15 are held in position by a tool clamp bar 28 which overlies the grooves 16 and engages the top surfaces of the tools 15 and is secured to the tool carrier 17 by counter-sunk cap screw 29. Thus, the assembly of tools 15, tool holder 17 and clamping bar form an integral unit which may be readily removed from the support 6 by loosening the nuts 26 and 27 and lifting off the tool holding assembly.

In order to hold this assembly down upon the support 6 vertical threaded studs 30 and 31 are carried by the lugs 23 and 23' respectively and a clamp 32, having slots 33 and 34 at its ends, engages the top of the tool clamp bar 28, the studs 30 and 31 extending up through the slots 33 and 34. When the nuts 35 and 36 are tightened the clamp 32 will hold the tool assembly firmly down against the sliding support 6.

By means of the above described tool holding mechanism the cutting tools 15 are rigidly held in position. Referring to Figure 3, the strip S moves in the direction of the arrow and, when the tube is being trimmed, its edge is first engaged by the left hand or front tool 15. In order that each tool may take substantially the same cut from the strip edge the tool support 17 is carried at a slight angle to the center line 7 of the strip, the front or left hand tool being farthest from the center line and the rear or right hand tool being closest to the center line. This angle of the tool support 17 is obtained by inserting a washer 37 between the end 19 of the holder 17 and the lug 23 and inserting a thinner washer 38 between the end 18 and the lug 23'. This is best seen in Figure 3, it being observed that a line across the cutting edges of the tools 15 is disposed at a slight angle to the center line 7 of the strip. By providing this adjustment of the multiple tool support 17 the setting up of the tools is greatly simplified. It is only necessary to remove the entire tool holding assembly from the support 6 and align the cutting edges of all of the tools 15 parallel to the inner edge of the supporting member 17. When this is done the clamp bar 28 is secured in position firmly holding the tools in place. This assembly is then placed over the studs 24 and 25, with suitable washers 37 and 38 in position, and when the nuts 26 and 27 are tightened the proper setting of each tool will be automatically obtained. After this is done the top hold-down clamp 32 is positioned.

Individual adjustment of the tools relative to the center line 7 of the strip is avoided by the above described mechanism and a much quicker and more accurate setting of the tools is secured. Each tool will take approximately the same cut on the edge of the strip, no tool will be overloaded and no cut will be sufficiently great to cause tearing or roughening of the strip edge. The shavings cut by each tool will pass outwardly between the tool and the adjacent backing-up lug 22. The clamp bar 28 completes the shaving or chip guide passage for each tool and, as will be explained later, a chute is provided to convey the shavings and chips completely away from the mechanism.

In order to support the strip and position it properly during the edge trimming operation I provide bottom supporting rolls or guides 39 and co-acting top rolls or guides 40. The bottom rolls 39 are individually mounted upon the shafts 41 carried by the sliding supports 5 and 6. As is clearly seen in Figure 6, the rolls 39 are disposed closely adjacent to the edges of the strip S and, as is seen in Figure 1, they are spaced in a direction of travel of the strip to give the desired support at each cutting tool. The top rolls 40 cooperate with the bottom rolls 39 and constitute guides to position and hold the strip and to prevent buckling, etc., while the tools are cutting. Overhanging arms 42 and 43 are carried by the sliding supports 5 and 6 respectively, the arm 42 being pivotally mounted on the slide 5 at one end at 44 and the arm 43 being similarly pivotally mounted on the support 6 at 45.

Referring particularly to Figure 2, a transverse shaft or pin 46 is carried by the arm 43 and in turn supports the floating bracket 47. Two of the top rolls 40 are mounted for rotation on shafts 48 and 49 on the bracket 47. A bar or rod 50 extends upwardly from the support 6 and has free movement in a suitable hole in the end flange 51 of the arm 43. The compression spring 52 abuts against the flange 51 and is engaged at its upper end by a washer 53. The nut 54 is threaded upon the rod 50 and, by adjusting the nut 54, the compression of the spring 52 may be adjusted thus varying the pressure between the bottom rolls 39 and the top rolls 40. By the floating bracket support 47 for the rolls 40 the pressure of the spring 52 is equalized and distributed and resilient engagement of the rolls 40 with the top of the strip S is obtained.

The arm 42 carries a second pair of rolls 40 in exactly the same manner as just described. As is seen in Figure 1, a rod 55 and nut 56 cooperate to provide means for adjusting the spring pressure on the arm 42 in the same manner as described above. The arms 42 and 43 are independently movable and independently adjustable. The bottom rolls 39 are so positioned that they will support the strip at the proper level to be trimmed by the cutting tools 14 and 15 and the spring pressed top rolls 40 co-act with the bottom rolls 39 to prevent buckling and chattering of the strip during cutting operation.

An edge guide roll 56 is mounted on a vertical shaft and is slidably supported at the strip entering end of the member 6 and a spring 57 resiliently presses this roll against the edge of the strip. The adjustable stop screw 58 may be locked in position by the lock nut 59 and is adapted to engage a part of the sliding support for the roll 56 to limit the movement of the roll 56 away from the strip. An edge roll or guide 60, similar to roll 56, is similarly supported on the sliding support 5.

In order to provide an adjustable gauge stop for the slides 5 and 6 and the cutting tools 14 and 15, a pair of adjustable rods 61 and 62 extend through the support shafts for the arms 42 and 43 and have threaded engagement therewith. Lock nuts 63 and 64 maintain the rods 61 and 62 in adjusted position. In Figure 1 the inner ends of the rods are shown in abutment. If it is desired to retract the tools 14 and 15 for any reason it is only necessary to turn the hand wheel 13 to move the slides 5 and 6 apart. Then, when it is desired to resume operations, the hand wheel is turned in the opposite direction until the rods 61 and 62 abut. When in this position the tools will again be set to give the same strip width as before the tools are withdrawn.

Exit end edge supporting rolls 65 and 66 are independently mounted for sliding movement on the base B toward and away from the center line of the strip. As is best seen in Figure 5, the roll 65 has a peripheral groove 67 and is mounted on a shaft 68 carried by a sliding member 69. The frame 70 supports the slide 69 and is in turn mounted in a suitable slideway 71 in the base B. A feed screw 72 is formed on the shaft 73 and engages threads in the frame or housing 70.

The roll 65 is caused to engage the edge of the strip S by means of a spring 74 which is enclosed in the housing 70. The movement of the roll 65, both toward and away from the strip S, is limited by a pin 75 which slides in an elongated slot 76 in the slide 69, and an adjusting screw 77, together with its lock nut 78, provide means for rendering the spring 74 ineffective and making the mounting for the roll 65 a rigid rather than a resilient one. The roll 66 is mounted in the same manner in a housing 79 and engages threads 80 on the shaft 73. Axial movement of the shaft 73 relative to the base B is prevented by collars 81 and 82 disposed on either side of the bearing 83 which forms a part of the base B. The end of the shaft 73 is preferably squared as seen at 84 to accommodate a wrench or handle whereby the shaft 73 may be turned to cause the rolls 65 and 66 to move toward or away from each other. This adjusting movement of the rolls 65 and 66 is entirely independent of movement of the sliding tool supports 5 and 6.

In Figure 6 the chip chute or guide 85 is shown in position. A similar chute 86 is mounted on the other side of the machine to take care of the chips and shavings from the tools 14. These chutes 85 and 86 are shown in dot and dash lines in Figure 1 and their details and supporting means are best illustrated in Figures 3 and 6. The chutes are, generally speaking, open topped grooved troughs having lugs 87 which are slotted at 88 to accommodate the thumb screws 89. The chute 85 is secured to the clamp 32 by a pair of these lugs 87 and thumb screws 89. The end wall 90 of the chute 85 is provided with a slotted opening 91 opposite the tools 15 and thus all chips and shavings cut from the strip by the tools 15 will be carried away from the machine by the chute 85. The chute 86 performs the same function for the tools 14.

In order firmly to secure the slides 5 and 6 in adjusted position I provide the tapered gibs 92 and 93 which have end flanges engaging the studs 94 and 95 respectively. These studs are secured in the slides 5 and 6 and by tightening the nuts 96 and 97 the tapered gibs firmly lock the slides in any adjusted position. When it is desired to change the adjustment of the tool slides the nuts 96 and 97 are loosened, thus permitting free movement of the slides upon turning the hand wheel 13.

Figure 11:
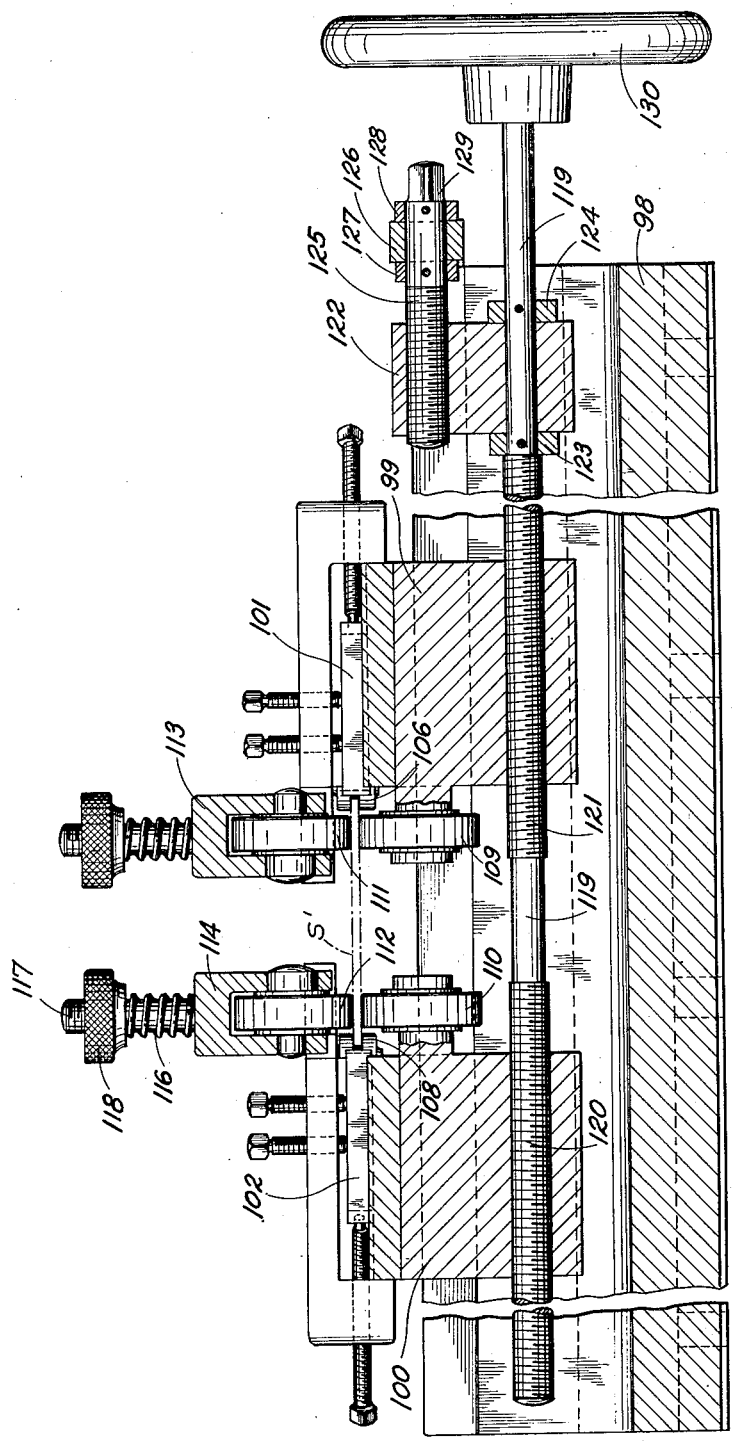
Figure 11 is a vertical cross-sectional view taken on line 11—11 of Figure 9.

A modified form of edge trimmer is shown in Figures 9, 10 and 11. As this device includes a number of features which are similar to those of the above described embodiment of my invention it will be necessary only rather briefly to describe the modification of Figures 9, 10 and 11.

A stationary base 98 carries the sliding tool holders 99 and 100. These tool holders support the single cutting tools 101 and 102 which are adapted to be adjusted toward the work by the screws 103 and 104. In some instances, such as trimming light gauge strip, where only a thin and fairly uniform trimming is required, the single cutting tools may be satisfactory. Edge guiding rolls 105 and 106 are mounted on vertical shafts carried by the tool slide 99 and edge rolls 107 and 108 are similarly carried by the slide 100. The strip S' is supported immediately adjacent the cutting edge of the tools by bottom rolls 109 and 110 mounted on and carried by the slides 99 and 100 respectively. The co-acting top rolls 111 and 112 are supported in pivoted yokes 113 and 114. The roll 112 is resiliently pressed against the top of the strip by the spring supports 115 and 116 supported on the vertical screw 117. By turning down the knurled nut 118 the pressure of the top roll 112 against the strip will be increased and releasing the nut 118 will decrease the pressure. The top roll 111 is similarly resiliently mounted, as seen in Fig. 11. A shaft 119 has oppositely threaded portions 120 and 121 which engage the tool slides 100 and 99 respectively. A sliding block 122 is supported on the base 98 and the shaft 119 passes therethrough, the collars 123 and 124 preventing relative axial movement of the shaft and block. An adjusting screw 125 has threaded engagement with the block 122 and has a bearing in the end flange 126 of the base 98. Collars 127 and 128 prevent axial movement of the screw 125 relative to the base 98 and it will be observed that, when a wrench or handle is applied to the end 129 of the screw 125, rotation of the screw will move the entire assembly of block 122, shaft 119, tool slides 99 and 100 and the parts which they carry, laterally as a unit on the base 98. This lateral shifting of the tools and guides as a unit is entirely independent of the adjustment effected by rotation of the shaft 119 through the hand wheel 130. Such rotation of the shaft 119 will move the slides 99 and 100 and the tools which are carried thereby toward or away from each other to vary the width of the trimmed strip.

Although my improved edge trimmer is intended primarily for use in connection with electric tube welding machines I do not wish to be limited to such an application as it will be understood that, by using tools which will stand high temperature, my edge trimmer may be used for sizing and finishing the edges of heated skelp just prior to hot butt welding. Furthermore, the device is useful in the formation of plain, unwelded butted tube from mill edge strip as it permits of an exceedingly accurate and simple adjustment and maintenance of the desired strip width.

Although I have described the illustrated embodiments of my invention in considerable detail it will be understood by those skilled in the art that numerous variations and modifications may be made in the apparatus shown and described herein without departing from the spirit of my invention. I do not, therefore, wish to be limited to the specific apparatus shown and described but claim as my invention all embodiments thereof coming within the scope of the appended claims.

I claim:

1. A trimmer for strip material of the class described including a base, a pair of tool supports on said base, means for moving said supports toward or away from each other, each of said supports having means for adjustably securing a cutting tool thereto, a cutting tool held on each of said supports by said securing means, strip supporting means, one of said strip supports being adapted to engage the strip adjacent a tool on one of said tool supports and another of said strip supports being adapted to engage the strip adjacent a tool on the other tool support, and co-acting, resiliently mounted means carried by said tool supports and adapted to engage the strip opposite said first named strip supporting means.

2. An edge trimmer for strip material of the class described including cutting tools adapted to engage opposite edges of a strip moving therebetween, a base, supports for said tools slidably mounted on said base for movement toward and away from each other, rolls mounted on and movable with said supports for positioning and maintaining the moving strip with its edges in cutting position relative to said tools, means for moving said tool supports simultaneously toward or away from each other, and means for moving said tool supports as a unit transversely of the line of travel of the strip.

3. An edge trimmer for strip material of the class described including cutting tools adapted to engage opposite edges of a strip moving therebetween, a base, supports for said tools slidably mounted on said base for movement toward and away from each other, rolls carried by said supports and positioned to engage the top and bottom surfaces of said strip adjacent said tools, edge rolls carried by said supports and positioned to engage the edges of said strip, at least some of said edge rolls having spring mounts to provide resilient engagement with the strip edges, and means for moving said tool supports simultaneously toward or away from each other.

4. An edge trimmer for strip material of the class described including cutting tools adapted to engage opposite edges of a strip moving therebetween, a base, supports for said tools slidably mounted on said base for movement toward and away from each other, rolls carried by said supports and positioned to engage the top and bottom surfaces of said strip adjacent said tools, edge rolls carried by said supports and positioned to engage the edges of said strip, at least some of said edge rolls having spring mounts to provide resilient engagement with the strip edges, means for rendering said spring mounts non-resilient, and means for moving said tool supports simultaneously toward or away from each other.

5. An edge trimmer for strip material of the class described including trimming means adapted to engage opposite edges of a strip moving therebetween, a base, supports for said trimming means slidably mounted on said base for movement toward and away from each other, rolls carried by said supports and positioned to engage the top and bottom surfaces of said strip adjacent said tools, edge guides carried by and movable with said supports and positioned to engage the edges of said strip, means for moving said trimming means toward or away from each other, a pair of independently supported edge guides and means for moving said independently supported edge guides toward or away from each other.

6. In an edge trimmer of the type described, cutting tools adapted to engage the edges of a strip moving therebetween, a base, supports for said tools slidable on said base, means for moving said supports toward and away from each other, a pair of edge guides mounted on and movable with said supports, a second pair of edge guides independently supported on said base, resilient means for providing a cushioned engagement of at least some of said edge guides with the strip edges, and means for rendering said resilient means ineffective whereby a solid non-cushioned engagement between the edge guides and the strip edges may be had.

7. In an edge trimmer for longitudinally moving strip material, a base carrying a tool support, a plurality of tools mounted on said support, said tools being secured in a tool carrier bar with their cutting edges spaced equally from a surface of said bar, and said bar being secured to said support with said surface disposed at an angle to the center line of movement of said strip and with the tool at the strip entering end of the series spaced the greatest distance from the center line of strip movement.

8. In an edge trimmer for longitudinally moving strip material, a base carrying a tool support, a plurality of tools mounted on said support, said tools being secured in a tool carrier bar with their cutting edges spaced equally from a surface of said bar, and said bar being secured to said support with said surface disposed at an angle to the center line of movement of said strip and with the tool at the strip entering end of the series spaced the greatest distance from the center line of strip movement, and means for moving said tool support on said base in a direction perpendicular to the center line of strip movement.

9. In an edge trimmer for longitudinally moving strip material, a base, tool supports on said base, means for moving said supports on said base toward or away from each other, tools carried by said supports, spaced rolls carried by one of said supports on fixed axes and having a portion of their peripheries disposed adjacent the cutting edges of tools carried by said one of said supports, a yoke pivotally mounted on said one of said supports, a roll carrier pivotally mounted on said yoke, and rolls supported by said roll carrier in opposed relation to said spaced rolls and co-acting therewith to maintain a strip in cutting position relative to the tools carried by said one of said supports.

10. In an edge trimmer for longitudinally moving strip material, a base, tool supports on said base, means for moving said supports on said base toward or away from each other, tools carried by said supports, spaced rolls carried by one of said supports on fixed axes, and having a portion of their peripheries disposed adjacent the cutting edges of tools carried by said one of said supports, a yoke pivotally mounted on said one of said supports, a roll carrier pivotally mounted on said yoke, rolls supported by said roll carrier in opposed relation to said spaced rolls and co-acting therewith to maintain a strip in cutting position relative to the tools carried by said one of said supports, and resilient means tending to move said yoke on its pivot toward said spaced rolls.

11. An edge trimmer for strip material of the class described including cutting means adapted to engage opposite edges of a strip moving therebetween, a base, supports for said tools slidably mounted on said base for movement toward and away from each other, strip supporting means for positioning and maintaining the moving strip with its edges in cutting position relative to said tools, means for moving said tool supports toward or away from each other, and means for moving said tool supports as a unit transversely of the line of travel of the strip.

12. An edge trimmer for strip material of the class described including cutting tools adapted to engage opposite edges of a strip moving therebetween, a base, supports for said tools slidably mounted on said base for movement toward and away from each other, strip supporting means positioned to engage the top and bottom surfaces of said strip adjacent said tools, edge guides carried by said tool supports and positioned to engage the edges of said strip, at least some of said edge guides having spring mounts to provide resilient engagement with the strip edges, and means for moving said tool supports toward or away from each other.

13. An edge trimmer for strip material of the class described including cutting tools adapted to engage opposite edges of a strip moving therebetween, a base, supports for said tools slidably mounted on said base for movement toward and away from each other, strip supporting means positioned to engage the top and bottom surfaces of said strip adjacent said tools, edge guides carried by said tool supports and positioned to engage the edges of said strip, at least some of said edge guides having spring mounts to provide resilient engagement with the strip edges, means for rendering said spring mounts non-resilient, and means for moving said tool supports simultaneously toward or away from each other.

FREDERIC M. DARNER